United States Patent
Chen et al.

(10) Patent No.: US 9,588,749 B2
(45) Date of Patent: Mar. 7, 2017

(54) CONFIGURATION TRANSFORM FOR APPLICATION DEPLOYMENT

(71) Applicant: Microsoft Technology Licensing, LLC, Redmond, WA (US)

(72) Inventors: Dong Chen, Bellevue, WA (US); Haonan Tan, Redmond, WA (US); Tao Cao, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 14/513,891

(22) Filed: Oct. 14, 2014

(65) Prior Publication Data

US 2016/0103667 A1    Apr. 14, 2016

(51) Int. Cl.
*G06F 9/445* (2006.01)
*G06F 9/44* (2006.01)

(52) U.S. Cl.
CPC .............. *G06F 8/60* (2013.01); *G06F 8/64* (2013.01); *G06F 8/71* (2013.01); *G06F 9/44505* (2013.01)

(58) Field of Classification Search
CPC ............... G06F 8/60; G06F 8/61; G06F 8/71
See application file for complete search history.

(56) References Cited

U.S. PATENT DOCUMENTS

| | | | |
|---|---|---|---|
| 7,318,070 B2 | 1/2008 | McGee et al. | |
| 7,499,933 B1 | 3/2009 | Simpson | |
| 7,694,277 B2 | 4/2010 | Yuknewicz et al. | |
| 7,827,548 B1* | 11/2010 | Anderson | G06F 8/71 717/174 |
| 7,895,591 B2 | 2/2011 | Spears | |
| 8,464,247 B2 | 6/2013 | Laska et al. | |
| 2003/0182652 A1 | 9/2003 | Custodio | |
| 2004/0123091 A1 | 6/2004 | Das | |
| 2007/0283344 A1* | 12/2007 | Apte | G06F 8/61 717/174 |
| 2011/0219146 A1* | 9/2011 | Jacobson | G06F 8/60 710/8 |

(Continued)

OTHER PUBLICATIONS

How to: Transform Web.config When Deploying a Web Application Project, MSDN Library, retrieved online on Oct. 24, 2016, pp. 1-4. Retrieved from the Internet: <URL: https://msdn.microsoft.com/en-us/library/dd465318(v=vs.100).aspx>.*

(Continued)

*Primary Examiner* — Tuan Q. Dam
*Assistant Examiner* — Hanh T Bui
(74) *Attorney, Agent, or Firm* — Steven J. Spellman; Thomas Wong; Micky Minhas

(57) ABSTRACT

Creating a deployment package for deploying an application. The method includes identifying a configuration dataset. The method further includes identifying a plurality of target environments. The method further includes transforming the configuration dataset, during build time, for each of the target environments to create a plurality of different configuration datasets corresponding to the different target environments. The method further includes packaging the plurality of configuration datasets with a deployable application entity to create a package that can be deployed to a plurality of different targets to make application deployment across multiple targets more efficient.

20 Claims, 3 Drawing Sheets

(56) References Cited

U.S. PATENT DOCUMENTS

| | | | | |
|---|---|---|---|---|
| 2011/0225579 | A1* | 9/2011 | Khandelwal | G06F 8/60 717/177 |
| 2011/0283194 | A1* | 11/2011 | Chen | G06F 8/61 715/735 |
| 2011/0296377 | A1* | 12/2011 | Morozov | G06F 8/30 717/113 |
| 2012/0005465 | A1* | 1/2012 | Attanasio | G06F 9/44505 713/1 |
| 2012/0089976 | A1* | 4/2012 | Ma | G06F 8/30 717/174 |
| 2012/0159471 | A1* | 6/2012 | de Souza | G06F 8/61 717/178 |
| 2012/0266158 | A1* | 10/2012 | Spivak | G06F 9/5055 717/175 |
| 2012/0317564 | A1* | 12/2012 | Lee | G06F 8/61 717/175 |
| 2013/0007693 | A1 | 1/2013 | Bliss et al. | |
| 2013/0167136 | A1 | 6/2013 | Goldman | |
| 2014/0337828 | A1* | 11/2014 | Jacobson | G06F 8/60 717/174 |
| 2015/0370550 | A1* | 12/2015 | Jacobson | G06F 8/60 717/174 |

OTHER PUBLICATIONS

Elad Fein et al., Using MATCON to Generate CASE Tools That Guide Deployment of Pre-Packaged Applications, ACM May 2011, pp. 1016-1018, retrieved online on Oct. 24, 2016. Retrieved from the Internet: <URL: http://delivery.acm.org/10.1145/1990000/1985981/p1016-fein.pdf?ip=151.207.250.51&id=1985981&acc=ACTIVE%20SERVICE&key=C15944E53D0ACA63%2E4D4702B0C3E>.*

Joshi, Vishal., "Web Deployment: Web.Config Transformation", Published on: Jun. 26, 2014 Available at: http://vishaljoshi.blogspot.in/2009/03/web-deployment-webconfig-transformation__23.html.

"Using Transformation files to transform web.config files for different target deployments in Asp.net 4.0", Published on: Mar. 2, 2011 Available at: http://www.shubho.net/2011/03/transformation-webconfig-aspnet-40.html.

Dykstra, Tom., "ASP.NET Web Deployment using Visual Studio: Web.config File Transformations", Published on: Feb. 15, 2013 Available at: http://www.asp.net/mvc/tutorials/deployment/visual-studio-web-deployment/web-config-transformations.

"International Search Report and Written Opinion issued in PCT Application No. PCT/US2015/054107", Mailed Jan. 27, 2016, 10 pages.

* cited by examiner

CONFIGURATION TRANSFORM FOR APPLICATION DEPLOYMENT

BACKGROUND

Background and Relevant Art

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Web and cloud applications are usually hosted in several environments during the application lifecycle. For example, application may be hosted in development environments, test environments, and production environments. Such applications may be hosted in different environments of a cloud service, such as Windows Azure available from Microsoft Corporation of Redmond, Wash. For each different environment, the configuration of the applications will have different configuration settings suitable to the environment. However, the original configuration file (web.config, in the case of Windows Azure applications) in code base may be generic and only good for one particular environment (for example, only the development environment). This configuration file will be put in the deployment package for all environments.

If the deployment package is deployed to environment server that differs from the server for which the configuration file was created, operation engineers may need to manually modify the configuration file post deployment on the server. This is a time consuming and error prone process. In addition, if a deployment has to be redeployed to a different server, the redeployment will suffer from the same deficiency in that the original configuration file will be redeployed as well and thus, the configuration file will need to be manually modified again. In this case, the application may be out of service until the configuration files have been modified again on the redeployment.

Alternatively, a development team could modify the configuration file for each environment first, and then build a deployment package for each different environment. However, each of the different deployment packages will have different build numbers and may have potentially different code. Additionally, consider the case where one of the deployment packages is a test deployment package and another is a production deployment package. The test deployment package will be the only deployment package tested while the production deployment package will be deployed, essentially untested.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for creating a deployment package for deploying an application. The method includes identifying a configuration dataset. The method further includes identifying a plurality of target environments. The method further includes transforming the configuration dataset, during build time, for each of the target environments to create a plurality of different configuration datasets corresponding to the different target environments. The method further includes packaging the plurality of configuration datasets with a deployable application entity to create a package that can be deployed to a plurality of different targets to make application deployment across multiple targets more efficient.

Another embodiment includes a method that may be practiced in a computing environment. The method includes acts for deploying an application entity. The method includes accessing a deployment package. The deployment package includes an application entity and a plurality of configuration datasets. The method further includes receiving a command from a deployment console indicating a target environment. Based on the command, the method includes selecting one of the configuration datasets and deploying the selected configuration dataset along with the application entity to the target environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments herein create and/or use a deployment package that includes a deployable application entity (such as an application binary or executable file) and plurality of different configuration datasets (such as configuration files). When an administrator deploys the application entity, the administrator can specify the target environment. This causes an appropriate configuration file to be selected for the target environment. The appropriate configuration file and deployable application entity are then deployed to the target environment, while the other configuration files are ignored or discarded. Thus, generally, some embodiments illustrated herein include one or more algorithms for creating a plurality of configuration files for a deployable application entity using transform technology during build time of the deployable application entity. Some embodiments illustrated herein include a tool, ready to use in software build systems, that includes binaries and scripts to implement the algorithms. Some embodiments illustrated herein include functionality for allowing an administrator to use a deployment package with multiple configuration datasets for a deployable application entity to deploy the deployable application entity to a target environment.

As noted above, embodiments described herein may implement a tool which allows for creation of a deployment package having a plurality of configuration datasets for a deployable application entity during the application build time. The package includes plurality of transformed configuration datasets, including a transformed configuration dataset (such as a configuration file) for each target environment to which the deployable application entity may be anticipated to be deployed. Hence, the single package can be used to deploy the deployable application entity (e.g. an executable application) to different environments without manual (or even automated) modifications to the configuration datasets on the host machines hosting the application after the application is deployed.

Figure 1:
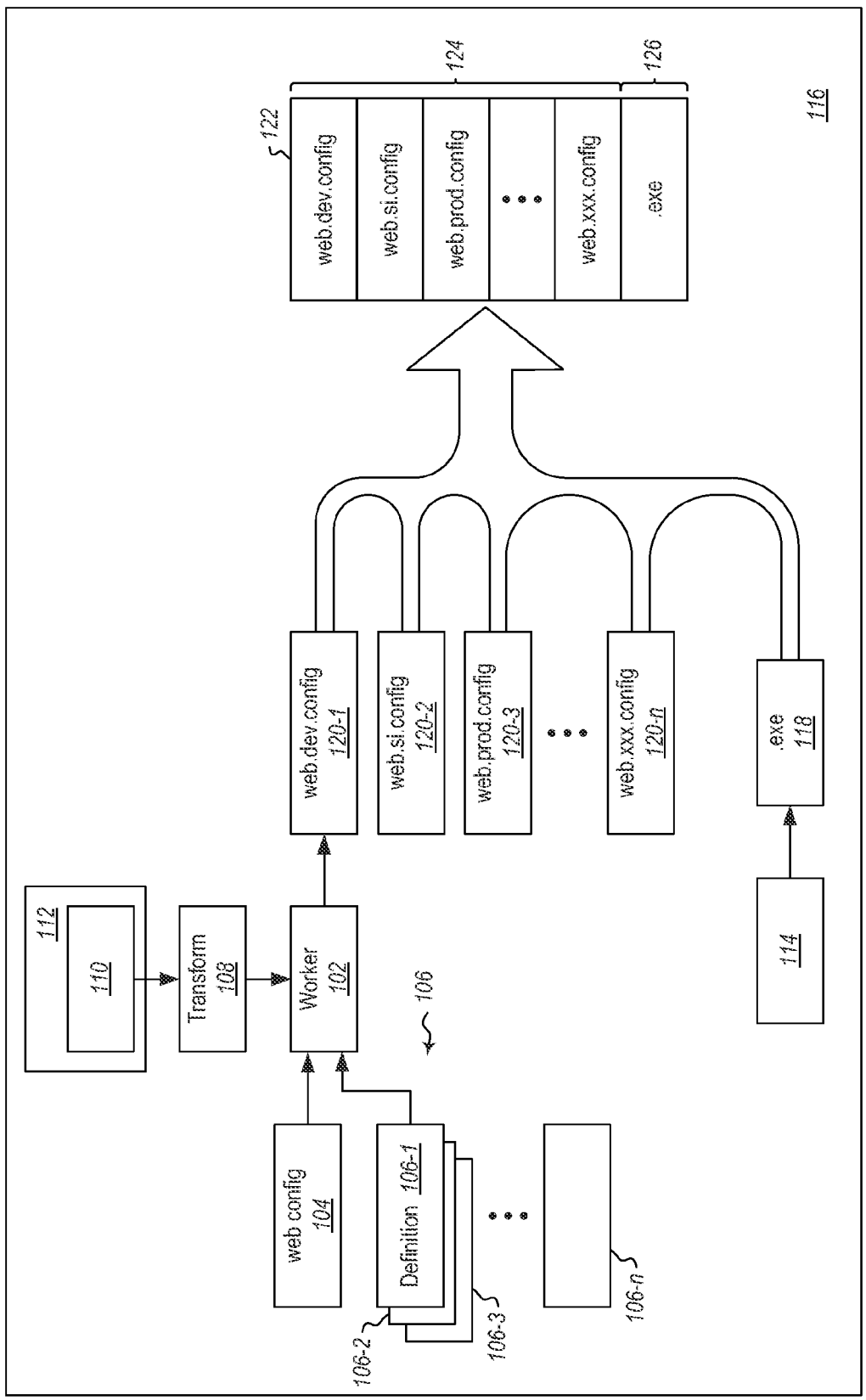
FIG. 1 illustrates a system for creating a deployment package.

Referring now to FIG. 1, a tool comprises the following components:

1. A worker application 102. The worker application 102 receives as input a master configuration dataset 104 and a plurality of definition datasets 106. Using these inputs, the worker application 102 produces a transformed configuration file suitable for particular environment.

2. A transform script 108. This script, by given source directory, and destination location, will invoke the worker application 102 to do the transformation for each environment.

3. A script 110 can be integrated into a targeting web application 112. This script 110 can be triggered to call the transform script 108, to ensure that the transformation for the integrated application will be done during the build.

Additional details are now illustrated.

An application 114 may be intended for deployment to a number of different target environments. The application may be implemented in source code. To deploy the application, the application 114 will need to undergo a build process 116 to create a deployable application entity 118 (such as an executable file). The application 114 may be intended for target environments such as a development environment, a testing environment, a production environment, or other environments.

For each of these different environments, a configuration dataset is needed to ensure that the application is configured properly in the different environments. A configuration dataset may be embodied as a configuration file. In Windows Azure, available from Microsoft Corporation of Redmond, Wash., the configuration file may be implemented as a web.config file. This naming convention is used for the examples illustrated in FIGS. 1 and 2. A virtually limitless number of configuration parameters may be specified in the configuration dataset. Generally, however, the configuration parameters include setting values for settings such as controls, namespaces, defaults, instrumentation, accounts, login information, features, or any one of a number of different parameters.

In the example illustrated in FIG. 1, the worker application 102 receives as input to configuration dataset 104 and a plurality of definition datasets 106, one dataset for each target environment. Thus, in the example illustrated in FIG. 1, there is a definition file 106-1 for a development environment, a definition file 106-2 for a test environment, a definition file 106-3 for a production environment, and a definition file 106-n illustrating that any one of a number of different target environments may be targeted and have a corresponding definition file.

In the illustrated example, the worker application 102, using the inputs, produces a number of configuration datasets (e.g. files) including a configuration dataset 120-1 for a development environment, a configuration dataset 120-2 for a test environment, a configuration dataset 120-3 for a production environment, and a configuration dataset 120-n illustrating any one of a number of different configuration datasets that may be created for different target environments.

In the example illustrated, the datasets are transformed versions of the configuration dataset 104. The configuration dataset 104 is named using a standard file name "web.config". In the illustrated example, this name is also transformed. Thus, the transformed configuration dataset 120-1 is named web.dev.config, the transformed configuration dataset 120-1 is named web.si.config, the transformed configuration dataset 120-1 is named web.prod.config, and the transformed configuration dataset 120-1 is named web.xxx.config (where xxx represents a blank designator which can be substituted from some appropriate annotation.

The transformed configuration datasets 120-1 through 120-n are created as part of a build process 116. In some embodiments, this may be accomplished using the transform functionality exposed by the msbuild.exe tool available from Microsoft Corporation of Redmond, Wash. This tool may also be used to transform the application 114 to a deployable application entity 118. The deployable application entity 118 and the transformed configuration datasets 120-1 through 120-n are assembled into a deployment package 122. The deployment package 122 is organized with the configuration datasets 120-1 through 120-n organized together in a first portion 124 of the deployment package 122 and the deployable application entity 118 organized into a second portion 126 of the deployment package 122.

Previously users could transform a configuration dataset, but it was done with a single transformation of a configuration dataset with a single deployable application entity 118. This resulted in different builds for different configuration datasets. Alternatively, different configuration datasets could have been created at deployment time. In contrast, embodiments described herein create all of the configuration datasets 120-1 through 120-n at build time with the deployable application entity 118 is created.

Figure 2:
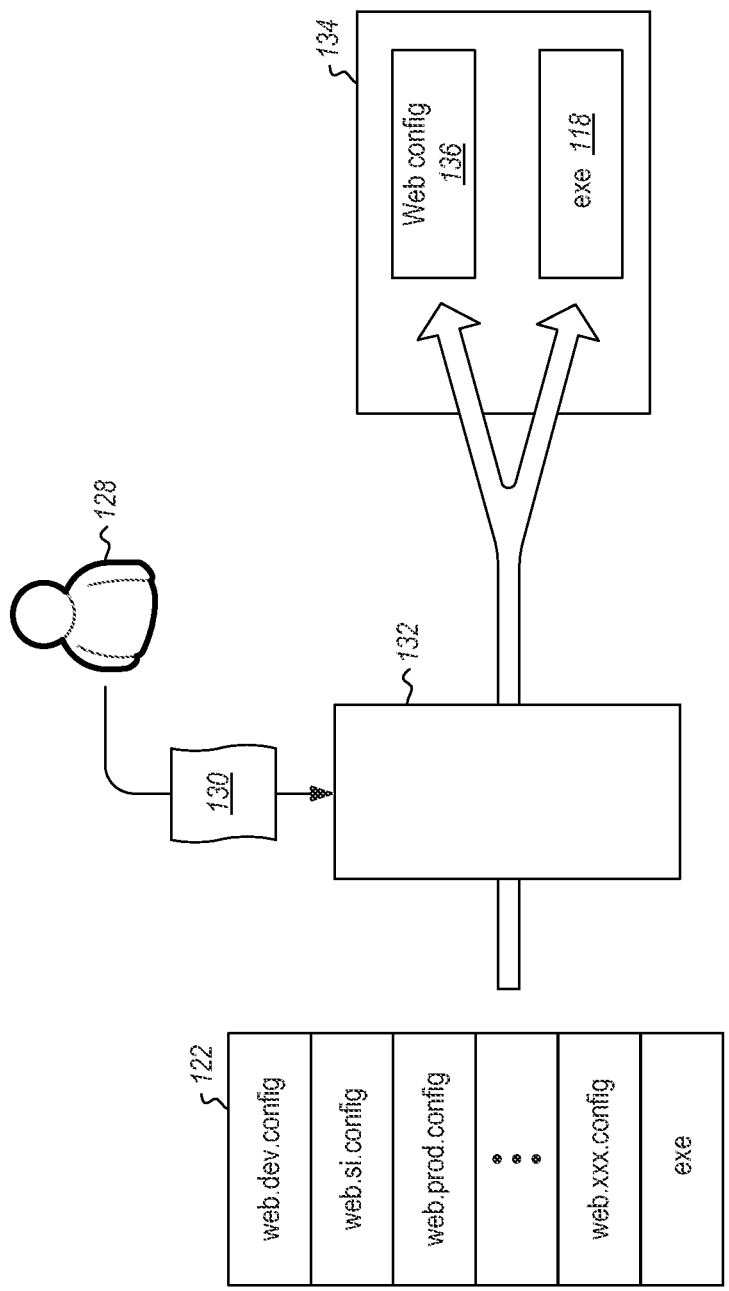
FIG. 2 illustrates a system for deploying a deployment package.

Referring now to FIG. 2, an example of deployable application entity 118 deployment is illustrated. In the example illustrated in FIG. 2, an administrator 128 enters a command 130 using a deployment tool 132. The command 130 specifies information about the target environment 134. For example, the command 130 may specify that the target environment 134 may be a development environment, a test environment, a production environment, or some other environment. The deployment tool 132 takes as input the deployment package 122. The deployment tool will determine which configuration dataset should be used for the deployment based on the command 130. The deployment tool will select that configuration dataset and deploy that configuration dataset along with the deployable application entity 118 to the target environment 134.

In the example illustrated, the selected configuration dataset will be renamed to an expected naming format. Thus for example, assuming that the target environment 134 is a production environment, and the administrator 128 enters one or more commands 130 indicating that the target environment is a production environment, the configuration dataset 120-3 (see FIG. 1) will be selected from the deployment package 122. The configuration dataset 120-3 will be renamed from web.prod.config to web.config as illustrated by the deployed configuration dataset 136. It should be noted that in other embodiments, other naming conventions or different classifications may be used. In some embodiments, renaming may not need to be performed as the configuration datasets may be appropriately named or stored in the deployment package 112 in a way that does not require renaming.

The deployed configuration dataset 136 will be deployed in the appropriate folder or other location on the target environment 134. In some embodiments, the deployable application entity 118 is also deployed in the same folder or other location on the target environment 134. The other configuration datasets in the deployment package 132 that are not used for the deployed configuration dataset 136 may be ignored or discarded depending on the implementation.

The target environment 134 may be a server, such as a cloud server, enterprise server or other computing device. However, embodiments are particularly useful in cloud environments where the target environment is a cloud server in such a cloud environment.

Embodiments may be implemented in enterprise environments (i.e. on-premise), cloud environments, hybrid enterprise/cloud environments, or other environments. For example, embodiments may be implemented where test, development, and production occur in the same or separate locations by the same or separate entities.

Notably, while development, test, and production examples have been illustrated specifically herein, other examples may be implemented. For example, target environments may be configured (and thus have corresponding configuration datasets in the deployment package 122) based on a target environment's (e.g. a server's) proximity to users. Thus for example, the target environment 134 may have different configuration settings when the target environment 134 is near end-users as compared to the configuration setting when the target environment 134 is further away from end-users. However, the same deployment package 122 may include configuration datasets for both of these scenarios (or any one of a number of different location scenarios) where only the appropriate configuration dataset is deployed for the appropriate scenario. Thus, a single deployment package 122 for a single build may be used for a number of different deployment scenarios where the different deployment scenarios have different proximities to end users.

In another example, target environments may be configured (and thus have corresponding configuration datasets in the deployment package 122) based on a target environment's (e.g. a server's) performance. Thus, for example, some target environments may have more performant hardware, network connections, larger storage, varying applications and services etc. Different configuration may be appropriate for each of these different target environments. This may be true even though the different target environments are for the same class of target environment. Thus for example, different test environments may have different performance characteristics and different configuration may be appropriate for the different test target environments. This can be facilitated by having different configuration datasets created for the same build of the deployable application entity 118. Thus, the same build can be used, but a different configuration data set can be used to create the configuration dataset 136 on the target environment 134.

Embodiments may facilitate the implementation of hybrid embodiment, such as an enterprise datacenter, where an enterprise is doing a portion of the work (e.g., development and test) and then moves to public cloud (e.g. for production). Embodiments may include a deployment package 122 with configuration datasets for local development and test targets and a different configuration dataset for the remote deployment target. Thus an administrator 128 can deploy the same build to different environments by issuing appropriate commands 130. Thus, the same build, in some embodiments, may be deployed to both local enterprise targets as well as remote cloud targets.

Embodiments may be extensible in that more environments can be added. However, this is typically done by adding addition configuration datasets by rebuilding the package and adding the additional configuration sets on the next build.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
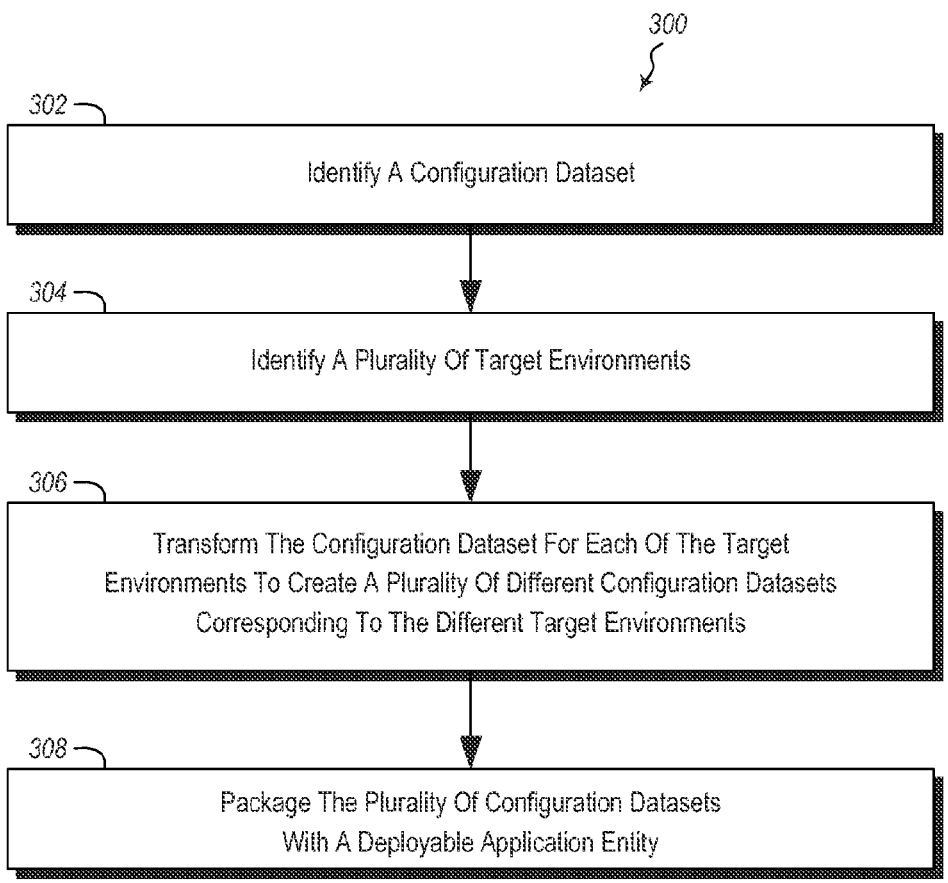
FIG. 3 illustrates a method of creating a deployment package.

Referring now to FIG. 3, a method 300 is illustrated. The method 300 may be practiced in a computing environment and includes acts for creating a deployment package for deploying an application. The method 300 includes identifying a configuration dataset (act 302). For example, the web.config configuration dataset 104 may be identified.

The method 300 further includes identifying a plurality of target environments (act 304). For example, embodiments identify that an application should be able to be deployed to a development environment, a test environment, a production environment, or other environments.

The method 300 further includes transforming the configuration dataset, during build time, for each of the target environments to create a plurality of different configuration datasets corresponding to the different target environments (act 306). For example, FIG. 1 illustrates that the configuration dataset 104 is transformed into a plurality of different configuration datasets 120-1, 120-2, 120-3 through 120-n.

The method 300 further includes packaging the plurality of configuration datasets with a deployable application entity (act 308). This can be done to create a package that can be deployed to a plurality of different targets to make application deployment across multiple targets more efficient. For example, the plurality of configuration datasets may be packaged with a binary, executable, other static file. FIG. 1 illustrates this packaging in the deployment package 122.

The method 300 may be practiced where transforming the configuration dataset is performed by executing a script. For example, FIG. 1 illustrates a transform script 108. In some such embodiments, executing the script calls a worker application, such as the worker 102, to transform the configuration dataset.

The method 300 may be practiced where transforming the configuration dataset, during build time, for each of the target environments to create a plurality of different configuration datasets corresponding to the different target environments includes transforming the configuration dataset to a plurality of different configuration datasets including at least one configuration dataset for one or more development environments, at least one dataset for one or more test environments, and at least one dataset for one or more production environments.

The method 300 may be practiced where transforming the configuration dataset, during build time, for each of the target environments to create a plurality of different configuration datasets corresponding to the different target environments comprises transforming the configuration dataset to a plurality of different configuration datasets including at least one configuration dataset for one or more on premise deployments together at least one configuration dataset for one or more cloud based deployments. In some such embodiments, transforming the configuration dataset, during build time, for each of the target environments to create a plurality of different configuration datasets corresponding to the different target environments includes transforming the configuration dataset to a plurality of different configuration datasets including at least one configuration dataset for one or more hybrid on premise/cloud environments. Thus, embodiments may have configuration datasets (such as those illustrated at 120-1 through 120-n) that include configuration information for local on premise deployments, remote cloud based deployments, or hybrid deployments that include elements of both on premise and cloud based deployments.

The method 300 may be practiced where transforming the configuration dataset, during build time, for each of the target environments to create a plurality of different configuration datasets corresponding to the different target environments comprises transforming the configuration dataset to a plurality of different configuration datasets including a plurality of different configuration dataset for different deployments with different proximities to users.

The method 300 may be practiced where transforming the configuration dataset, during build time, for each of the target environments to create a plurality of different configuration datasets corresponding to the different target environments comprises transforming the configuration dataset to a plurality of different configuration datasets including a plurality of different configuration dataset for different deployments with different performance characteristics.

The method 300 may further include storing the plurality of different configuration datasets in one structure while storing the application entity in a different data structure on a build server.

The method 300 may be practiced where packaging the plurality of configuration datasets with a deployable application entity comprises putting the configuration datasets in one portion of the package and the application entity in a different portion of the package. For example, FIG. 1 illustrates the different portions 124 and 126.

Figure 4:
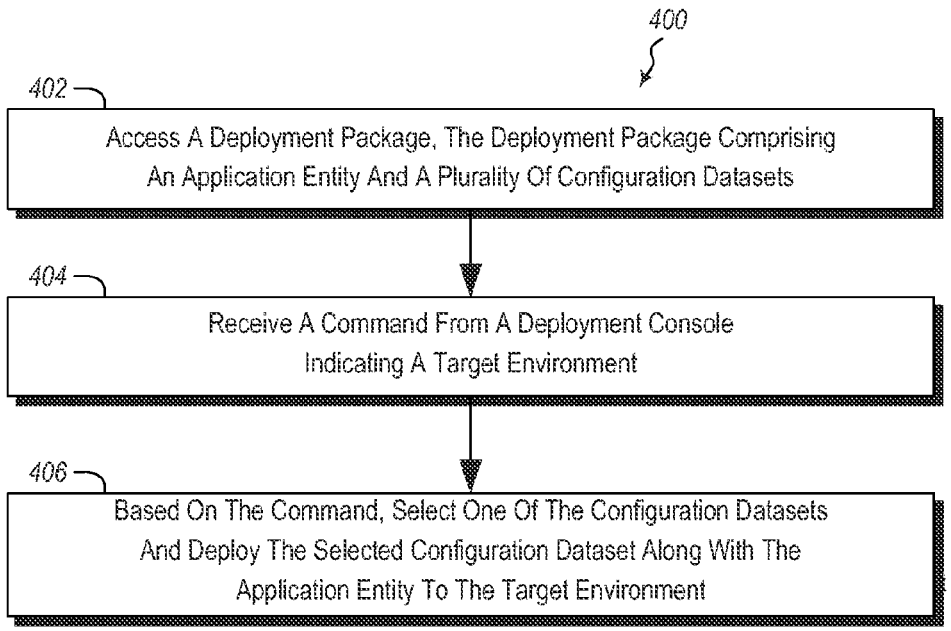
FIG. 4 illustrates a method of deploying an application entity.

Referring now to FIG. 4, another method 400 is illustrated. The method 400 may be practiced in a computing environment. The method 400 includes acts for deploying an application entity. The method. 400 includes accessing a deployment package, the deployment package comprising an application entity and a plurality of configuration datasets (act 402). For example, FIG. 2 illustrates accessing the deployment package 122, which includes various configuration datasets and an executable file.

The method 400 further includes receiving a command from a deployment console indicating a target environment (act 404). For example, the administrator 128 can send a command 130 using a console 132 to specify a target environment 134.

The method 400 further includes based on the command, selecting one of the configuration datasets and deploying the selected configuration dataset along with the application entity to the target environment (act 406). Thus, for example, as illustrated in FIG. 2, the web.config configuration dataset 136 includes one of the configuration datasets from the deployment package 122. Although in the illustrated example, it has been renamed. Thus, in some embodiments, the plurality of configuration datasets are named with modified versions of a standard name for a configuration dataset and the method further comprising renaming the selected configuration dataset to the standard name.

The method 400 may be practiced where deploying comprises moving the configuration dataset to a same folder with the application entity on the target environment. Thus, for example, the configuration dataset 136 and application entity 118 may be deployed to the same folder on the target environment 134.

The method 400 may be practiced where selecting one of the configuration datasets includes selecting from a plurality of different configuration datasets comprising at least one configuration dataset for one or more development environments, at least one dataset for one or more test environments, and at least one dataset for one or more production environments.

The method 400 may be practiced where selecting one of the configuration datasets includes selecting from a plurality of different configuration datasets including at least one configuration dataset for one or more on premise deployments together at least one configuration dataset for one or more cloud based deployments.

The method 400 may be practiced where selecting one of the configuration datasets includes selecting from a plurality of different configuration datasets including at least one configuration dataset for one or more hybrid on premise/cloud environments.

The method 400 may be practiced where selecting one of the configuration datasets includes selecting from a plurality of different configuration datasets including a plurality of different configuration dataset for different deployments with different proximities to users.

The method 400 may be practiced where selecting one of the configuration datasets includes selecting from a plurality of different configuration datasets including a plurality of different configuration dataset for different deployments with different performance characteristics.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which conic within the meaning and range of equivalency of the claims are to be embraced within their scope.

What is claimed is:

1. A method, implemented at a computer system that includes one or more processors, of creating a single deployment package for deploying a deployable application entity to a plurality of different target environments, the method comprising:

identifying a configuration dataset defining one or more configuration parameters for configuring the deployable application entity;

identifying a plurality of target environments into which the application entity is deployable, including identifying a plurality of different definition datasets, each definition dataset corresponding to one of the plurality of target environments, each definition dataset defining one more unique configuration settings specific to its corresponding target environment;

during a build time, transforming the configuration dataset for each of the plurality of target environments, based on the definition dataset corresponding to each of plurality of target environments, to create a plurality of different transformed configuration datasets that each corresponds to one of the target environments and that each includes a combination of the configuration dataset and one of the definition datasets; and packaging the plurality of transformed configuration datasets with the deployable application entity to create a single deployment package that is deployable to each of the plurality of different target environments, each target environment being enabled to use its corresponding transformed configuration dataset to configure the deployable application entity for operation within the target environment.

2. The method of claim 1, wherein transforming the configuration dataset is performed by executing a script.

3. The method of claim 2, wherein executing the script calls a worker application to transform the configuration dataset.

4. The method of claim 1, wherein transforming the configuration dataset comprises creating at least one transformed configuration dataset for a test environment, and at least one transformed configuration dataset for one or more production environments.

5. The method of claim 1, wherein transforming the configuration dataset comprises creating at least one transformed configuration dataset for an on premise deployment and at least one transformed configuration dataset for one or more cloud based deployments.

6. The method of claim 5, wherein the plurality of different transformed configuration datasets includes at least one transformed configuration dataset for one or more hybrid on premise/cloud environments.

7. The method of claim 1, wherein the plurality of different transformed configuration datasets includes a plurality of different transformed configuration datasets for different deployments with different proximities to users.

8. The method of claim 1, wherein the plurality of different transformed configuration datasets includes a plurality of different transformed configuration datasets for different deployments with different performance characteristics.

9. The method of claim 1, wherein packaging the plurality of transformed configuration datasets with the deployable application entity comprises putting the transformed configuration datasets in one portion of the package and the deployable application entity in a different portion of the package.

10. The method of claim 1, wherein the plurality of transformed configuration datasets are named with modified versions of a standard name for the configuration dataset.

11. The method of claim 1, further comprising:
sending the single deployment package to each of the plurality of target environments, causing each target environment to deploy the deployable application entity at the target environment based on the transformed configuration dataset corresponding to the target environment.

12. A computer system, comprising:
one or more processors; and
one or more computer-readable media having stored thereon computer-executable instructions that are executable by the one or more processors to cause the computer system to create a single deployment package for deploying a deployable application entity to a plurality of different target environments, the computer-executable instructions including instructions that are executable to cause to computer system to perform at least the following:
identify a configuration dataset defining one or more configuration parameters for configuring the deployable application entity;
identify a plurality of target environments into which the application entity is deployable, including identifying a plurality of different definition datasets, each definition dataset corresponding to one of the plurality of target environments, each definition dataset defining one more unique configuration settings specific to its corresponding target environment;
during a build time, transform the configuration dataset for each of the plurality of target environments, based on the definition dataset corresponding to each of plurality of target environments, to create a plurality of different transformed configuration datasets that each corresponds to one of the target environments and that each includes a combination of the configuration dataset and one of the definition datasets; and
package the plurality of transformed configuration datasets with the deployable application entity to create a single deployment package that is deployable to each of the plurality of different target environments, each target environment being enabled to use its corresponding transformed configuration dataset to configure the deployable application entity for operation within the target environment.

13. The computer system of claim 12, wherein transforming the configuration dataset is performed by executing a script.

14. The computer system of claim 13, wherein executing the script calls a worker application to transform the configuration dataset.

15. The computer system of claim 12, wherein transforming the configuration dataset comprises creating at least one transformed configuration dataset for a test environment, and at least one transformed configuration dataset for one or more production environments.

16. The computer system of claim 12, wherein transforming the configuration dataset comprises creating at least one transformed configuration dataset for an on premise deployment and at least one transformed configuration dataset for one or more cloud based deployments.

17. The computer system of claim 12, wherein the plurality of different transformed configuration datasets includes a plurality of different transformed configuration datasets for different deployments with different proximities to users.

18. The computer system of claim 12, wherein the plurality of different transformed configuration datasets includes a plurality of different transformed configuration datasets for different deployments with different performance characteristics.

19. The computer system of claim 12, the computer-executable instructions also including instructions that are executable to cause to computer system to send the single deployment package to each of the plurality of target environments, causing each target environment to deploy the deployable application entity at the target environment based on the transformed configuration dataset corresponding to the target environment.

20. A computer program product comprising one or more hardware storage devices having stored thereon computer-executable instructions that are executable by one or more processors of a computer system to cause the computer system to create a single deployment package for deploying a deployable application entity to a plurality of different target environments, the computer-executable instructions including instructions that are executable to cause to computer system to perform at least the following:
identify a configuration dataset defining one or more configuration parameters for configuring the deployable application entity;
identify a plurality of target environments into which the application entity is deployable, including identifying a plurality of different definition datasets, each definition dataset corresponding to one of the plurality of target environments, each definition dataset defining one more unique configuration settings specific to its corresponding target environment;

during a build time, transform the configuration dataset for each of the plurality of target environments, based on the definition dataset corresponding to each of plurality of target environments, to create a plurality of different transformed configuration datasets that each corresponds to one of the target environments and that each includes a combination of the configuration dataset and one of the definition datasets; and package the plurality of transformed configuration datasets with the deployable application entity to create a single deployment package that is deployable to each of the plurality of different target environments, each target environment being enabled to use its corresponding transformed configuration dataset to configure the deployable application entity for operation within the target environment.

* * * * *